(12) United States Patent
Schürg et al.

(10) Patent No.: US 9,358,913 B2
(45) Date of Patent: Jun. 7, 2016

(54) FLIGHT PASSENGER SEATING DEVICE

(75) Inventors: Hartmut Schürg, Schwäbisch Hall (DE); Andreas Erb, Schwäbisch Hall (DE); Jens Jakubowski, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 795 days.

(21) Appl. No.: 13/254,184

(22) PCT Filed: Mar. 2, 2010

(86) PCT No.: PCT/EP2010/001276
§ 371 (c)(1),
(2), (4) Date: Nov. 15, 2011

(87) PCT Pub. No.: WO2010/099926
PCT Pub. Date: Sep. 10, 2010

(65) Prior Publication Data
US 2012/0048999 A1    Mar. 1, 2012

(30) Foreign Application Priority Data
Mar. 3, 2009   (DE) .......... 10 2009 011 387

(51) Int. Cl.
*B60N 2/66* (2006.01)
*B60N 2/22* (2006.01)
*B64D 11/06* (2006.01)

(52) U.S. Cl.
CPC ............... *B60N 2/66* (2013.01); *B60N 2/2222* (2013.01); *B64D 11/06* (2013.01); *B64D 11/064* (2014.12)

(58) Field of Classification Search
CPC ........ B60N 2/2222; B60N 2/66; B64D 11/06; B64D 2011/0606
USPC ............................................ 297/284.4, 284.8
See application file for complete search history.

(56) References Cited

U.S. PATENT DOCUMENTS

| | | | |
|---|---|---|---|
| 3,902,755 A | 9/1975 | Sirot | |
| 7,063,384 B2 * | 6/2006 | Liu | 297/284.4 |
| 7,475,943 B1 * | 1/2009 | Huang | 297/284.4 |
| 7,997,650 B2 * | 8/2011 | McMillen et al. | 297/284.4 |
| 8,313,140 B2 * | 11/2012 | Niitsuma et al. | 297/216.12 |

(Continued)

FOREIGN PATENT DOCUMENTS

| | | |
|---|---|---|
| DE | 199 10 666 A1 | 9/2000 |
| DE | 101 351 22 C1 | 12/2002 |

(Continued)

OTHER PUBLICATIONS

German Search Report mailed on Feb. 25, 2010 for the corresponding German patent application No. 10 2009 011 387.8 (partial English translation only).

(Continued)

*Primary Examiner* — David R Dunn
*Assistant Examiner* — Jody Giacoman
(74) *Attorney, Agent, or Firm* — Posz Law Group, PLC

(57) ABSTRACT

A flight passenger seating device comprising a backrest having a first backrest unit. The backrest has a second backrest unit and a bearing unit which movably receives the second backrest unit relative to the first backrest unit.

10 Claims, 7 Drawing Sheets

(56) References Cited

U.S. PATENT DOCUMENTS

| | | | |
|---|---|---|---|
| 8,360,522 B2 * | 1/2013 | Akutsu | 297/284.4 |
| 8,622,468 B2 * | 1/2014 | Masuda et al. | 297/113 |
| 2004/0051003 A1 | 3/2004 | Cheung | |
| 2007/0228790 A1 | 10/2007 | Schurg et al. | |
| 2010/0141001 A1 * | 6/2010 | Matano et al. | 297/284.8 |

FOREIGN PATENT DOCUMENTS

| | | |
|---|---|---|
| DE | 10 2005 022 165 A1 | 11/2006 |
| DE | 10 2007 004 767 A1 | 8/2008 |
| EP | 0 639 479 A1 | 8/1994 |
| EP | 1 839 533 A2 | 10/2007 |
| JP | A-06-072216 | 3/1994 |
| JP | A-06-072218 | 3/1994 |
| JP | A-06-072219 | 3/1994 |
| JP | A-06-072220 | 3/1994 |
| WO | WO 2005/047057 | 5/2005 |

OTHER PUBLICATIONS

International Preliminary Report on Patentability and Written Opinion mailed Sep. 6, 2011 for the corresponding International patent application No. PCT/EP2010/001276.

European Office Action mailed Nov. 27, 2012 for the corresponding European patent application No. 10 709 397.3 (and partial English translation).

International Search Report mailed on Oct. 13, 2010 for the corresponding International patent application No. PCT/EP2010/001276 (English copy enclosed).

German Search Report mailed on Feb. 25, 2010 for the corresponding German patent application No. 10 2009 011 387.8 (German language report enclosed).

* cited by examiner

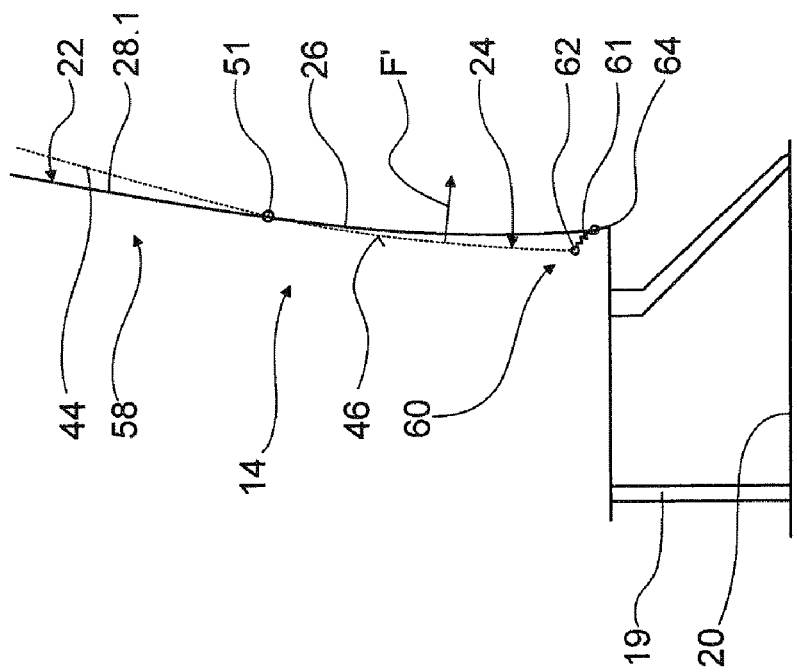
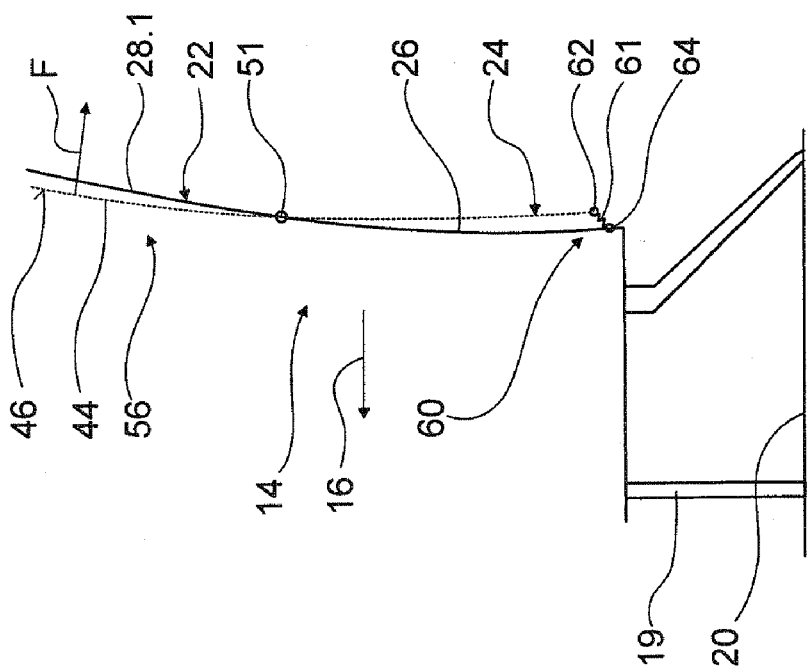

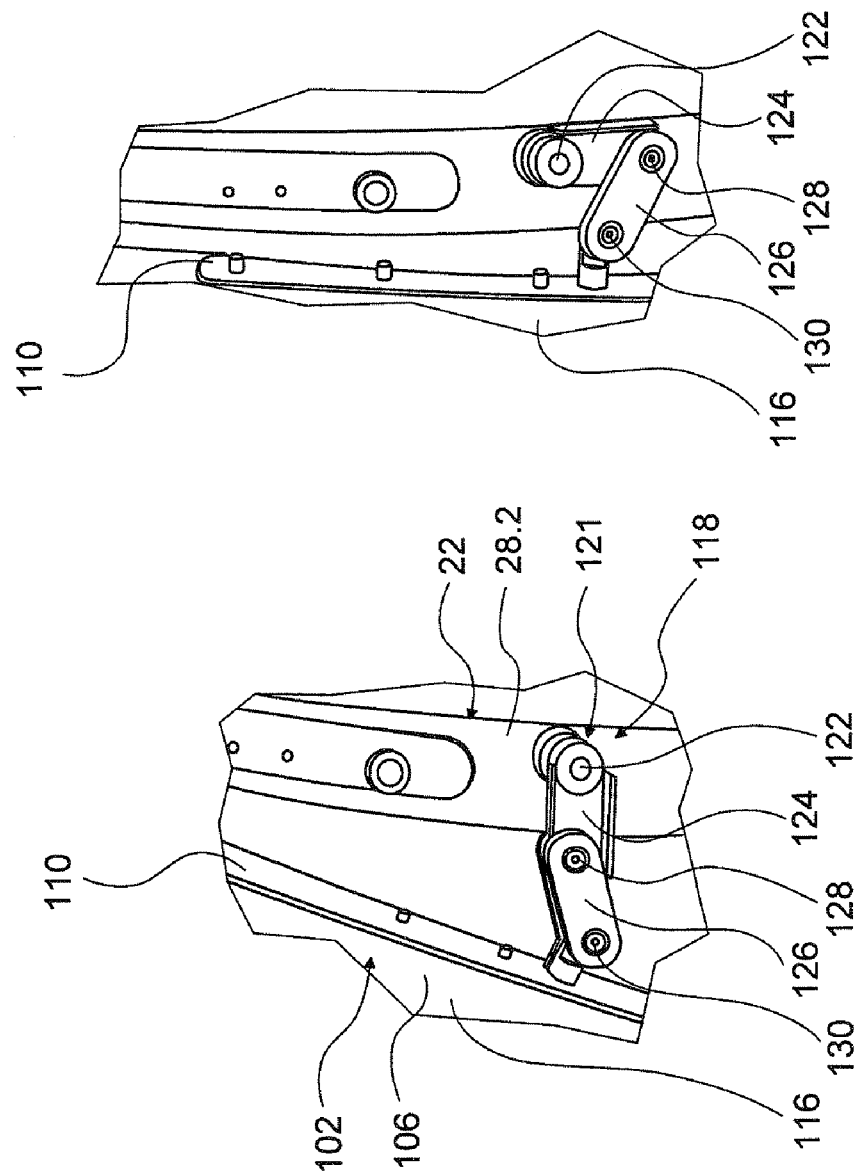

FLIGHT PASSENGER SEATING DEVICE

CROSS REFERENCE TO RELATED APPLICATIONS

This application is a U.S. national stage application of PCT/EP2010/001276 filed on Mar. 2, 2010, and claims priority to, and incorporates by reference, German patent application No. 10 2009 011 387.8 filed on Mar. 3, 2009.

BACKGROUND

The invention is based on a flight passenger seating device comprising a backrest.

Seating devices for providing seating in aircraft cabins are conventionally provided with a backrest, which is either movably mounted relative to a seat surface between an upright position and an inclined comfort position or which is rigidly coupled to a seat mounting unit in order to achieve a large number of seat rows, in particular with regard to use on short-haul flights, and by which the aircraft cabin is provided with seating.

The object of the invention is to provide a flight passenger seating device which offers advantageous features with regard to the space taken up by a flight passenger seat and additionally provides a high degree of comfort for a passenger.

SUMMARY

The invention is based on a flight passenger seating device, comprising a backrest which has a first backrest unit.

It is proposed that the backrest has a second backrest unit and a bearing unit which movably mounts the second backrest unit relative to the first backrest unit. As a result, within a constructional space of the flight passenger seat which is conventionally provided for the backrest, it is possible to achieve advantageous mobility of the backrest components, wherein, for example, a comfort position is able to be provided for a passenger without a further space having to be used. This invention is suitable, in particular, for use in a flight passenger seat, wherein the passenger comfort is able to be increased significantly without altering the seating of an aircraft cabin, in particular without altering the spacing between two successive seat rows. This advantage applies, in particular, when the first backrest unit is rigidly connected to a mounting unit of the flight passenger seating device, which is provided for the mountings thereof on an aircraft cabin floor. The mounting unit may preferably comprise seat feet, a supporting tube unit and/or one or more seat dividers, and may connect together a plurality of adjacent aircraft seats of a seat row.

"Backrest unit" is intended to be understood, in particular, as a one-piece component of the backrest or an assembly of components of the backrest which are rigidly connected together such that the movement of a backrest unit is regarded as a movement of a rigid body. The bearing unit may, for example, have a pivot axis unit, by means of which the second backrest unit may perform pivoting movements relative to the first backrest unit.

In a preferred embodiment of the invention, it is proposed that at least the second backrest unit forms a bearing surface for supporting a cushion unit. It is particularly advantageous if the first backrest unit and the second backrest unit form a bearing surface for supporting the cushion unit. In this connection, it is proposed that the first backrest unit and the second backrest unit form, by cooperation, a bearing surface for supporting a cushion unit, wherein the second backrest unit forms at least a substantial part of the bearing surface. As a result, a high degree of passenger comfort may be achieved as a large part of the backrest may be designed to be movable.

In particular, the bearing surface formed by the second backrest unit is associated with the region of the flight passenger seat which corresponds to the torso. Thus, the size of the bearing surface of the second backrest unit preferably corresponds at least to the size of a substantial part of the region of the flight passenger seat which corresponds to the torso. In order to achieve a particularly comfortable support of the entire torso region of a passenger, the size of the bearing surface relative to a shoulder width and a torso length, in particular, correspond at least to the overall size of the torso of a passenger of average body size. As regards the torso length, it preferably extends from a pelvic region to a shoulder region of the flight passenger seat. In this case, it has a dimension—relative to the dimension of the backrest in the longitudinal direction thereof—which is advantageously at least 30%, in particular at least 50%, of the overall size of the backrest in the longitudinal direction thereof. With regard to a shoulder width, relative to a transverse seat direction which is aligned parallel to an aircraft cabin floor and perpendicular to the flying direction, the bearing surface formed by the second backrest unit preferably extends over at least 70%, advantageously over at least 80%, of the size of the backrest in the transverse seat direction. A bearing surface associated with a headrest region is preferably formed by the first backrest unit.

To form a bearing surface, the first and/or the second backrest unit preferably has a plate which forms a bearing surface preferably configured as a continuous, uninterrupted surface, on which the cushion unit bears in the mounted state and which is oriented substantially parallel to a backrest surface formed by the cushion unit. In particular, the size of the surface of the bearing surface formed by the backrest units corresponds at least to a substantial part of the backrest surface.

A particularly space-saving embodiment may be achieved when the first backrest unit has a backrest frame comprising at least two frame parts, and the second backrest unit is arranged between the frame parts. In this case, the term "between" refers to the transverse seat direction of the flight passenger seat. The backrest frame conventionally serves as a basic structure of the backrest and is preferably of U-shaped configuration, wherein the second backrest unit is movably mounted between, for example, the frame parts which are preferably configured as arms.

A particularly simple and intuitive actuation of the second movable backrest unit may be achieved when at least the second backrest unit forms a bearing surface for supporting a cushion unit, the bearing unit movably mounts the second backrest unit relative to the first backrest unit between two end positions, and the backrest has a coupling unit which is designed so that a force exerted on the bearing surface effects a movement of the second backrest unit from an end position. Particularly preferably, the force exerted on the bearing surface of the second backrest unit is generated by means of a movement which the passenger performs with his/her back. As a movement of the back of the passenger effects the movement of the second backrest unit, a particularly intuitive operation of the flight passenger seat may be achieved. Moreover, as a result, advantageously further actuation means for activating the movement of the second backrest unit and/or locking and/or unlocking means may be dispensed with. The coupling unit couples the second backrest unit with a further component which is preferably rigidly connected to the first backrest unit. This component may be a component of the first backrest unit, a mounting unit, a seat floor bearing unit, an armrest unit, etc.

The end positions may, for example, be secured by stop means and/or by the coupling unit, by inherent force. For example, the end positions may be secured as stable end positions by the coupling unit, by means of a dead-center mechanism, catch mechanism or over-centering mechanism. This may be achieved particularly easily if the coupling unit has a spring element. For example, the spring element may be configured as a dead-center spring. In an advantageous variant, the spring hardness and/or the maximum spring path of the spring element may be set by an adjusting means in order to be able to adapt the end positions, which have been reached, to the body size of the passenger.

The passenger comfort may also be further increased if the backrest has a third backrest unit and a bearing device which movably mounts the third backrest unit relative to the second backrest unit. By means of the bearing unit, the third backrest unit, which is different from the first backrest unit, is preferably movable relative to the first backrest unit. The bearing device may, for example, have a pivot axis unit by means of which the third backrest unit may perform pivoting movements relative to the second backrest unit.

In a preferred embodiment of the invention, it is proposed that the third backrest unit has a lumbar support. "Lumbar support" is intended to be understood, in particular, as a component which is provided for supporting the human body in the lower spinal region, in particular exclusively in this region. To this end, the lumbar support is preferably arranged in the lowest region of the backrest, wherein the lumbar support—relative to the size of the backrest in the longitudinal direction thereof—advantageously extends over at least 25%, but by a maximum of 40% of the longitudinal dimension of the backrest.

The operation of the flight passenger seating device may also be further advantageously simplified, by the backrest having a coupler mechanism which effects a movement of the third backrest unit relative to the second backrest unit with a movement of the second backrest unit relative to the first backrest unit. To this end, the coupler mechanism has advantageous coupling points which are attached to the second backrest unit, to the third backrest unit and/or to a component which is preferably rigidly connected to the first backrest unit. Said component may be a component of the first backrest unit, a mounting unit, a seat floor bearing unit, an armrest unit, etc. The coupler mechanism connects said coupling points together such that a movement of the second backrest unit relative to the first backrest unit is used for instigating a movement of the third backrest unit relative to the second backrest unit. In particular, the coupler mechanism has a coupling which is used to move the lumbar support automatically into a lumbar support position with a movement of the second backrest unit into a comfort position.

In a further embodiment of the invention, it is proposed that the second backrest unit has a lumbar support, the bearing unit movably mounts the lumbar support between at least two stable positions relative to the first backrest unit, and a mechanical actuation unit is provided which serves for activating a movement of the lumbar support from a stable position. As a result, a possibility of adjustment is achieved for a passenger, wherein a particularly small constructional space is taken up by the actuation unit. "Mechanical actuation unit", in particular, is intended to be understood as an actuation unit which has exclusively mechanical actuation members, wherein pneumatic and/or electronic actuation members are dispensed with. In this case, the actuation unit preferably has an actuation member which may be actuated by an operator and which is operatively connected to at least one further mechanical actuation member and by means of which a movement of the lumbar support may be instigated relative to the first backrest unit. By dispensing with pneumatic and/or electronic means, a large amount of constructional space may be saved. The stable positions may be configured as end positions or as intermediate positions.

A particularly compact embodiment may be achieved if the mechanical actuation unit has a lever mechanism. In particular, large forces may be transmitted by means of a compact arrangement of components. In a preferred embodiment, the lever mechanism has lever members which form a toggle lever.

It is also proposed that the actuation unit has two actuation members which are arranged on both sides of the lumbar support and which are able to be actuated independently of one another, whereby a high degree of flexibility in adjusting comfort positions may be achieved. In this case, the term "on both sides" refers to the transverse seat direction of a flight passenger seat. Moreover, a coupling device for coupling the actuation members may be dispensed with, whereby further constructional space may be saved.

Moreover, it is proposed that the first backrest unit has a backrest frame with at least one frame part and the actuation unit comprises an actuation member which may be actuated by the passenger and which is arranged on the frame part, whereby a space-saving arrangement of the actuation unit may be achieved. A particularly efficient use of constructional space may also be achieved if the actuation unit has actuation members which are arranged on opposing sides of the frame part.

BRIEF DESCRIPTION OF THE DRAWINGS

Further advantages are revealed from the following description of the drawings. Exemplary embodiments of the invention are shown in the drawings. The description and the claims contain numerous features in combination. The person skilled in the art will also expediently consider the features individually and combine them to form further meaningful combinations.

FIG. 2*a* is a schematic view of a coupling between the first backrest unit and the second backrest unit in an upright position, FIG. 2*b* is the schematic view of FIG. 2*a* in an inclined position of the movable backrest unit, FIG. 7*a* is a detailed view of the lever mechanism in a support position of the lumbar support and FIG. 7*b* is the view of FIG. 7*a* with the lumbar support folded back.

DETAILED DESCRIPTION OF THE PREFERRED EMBODIMENTS

Figure 1:
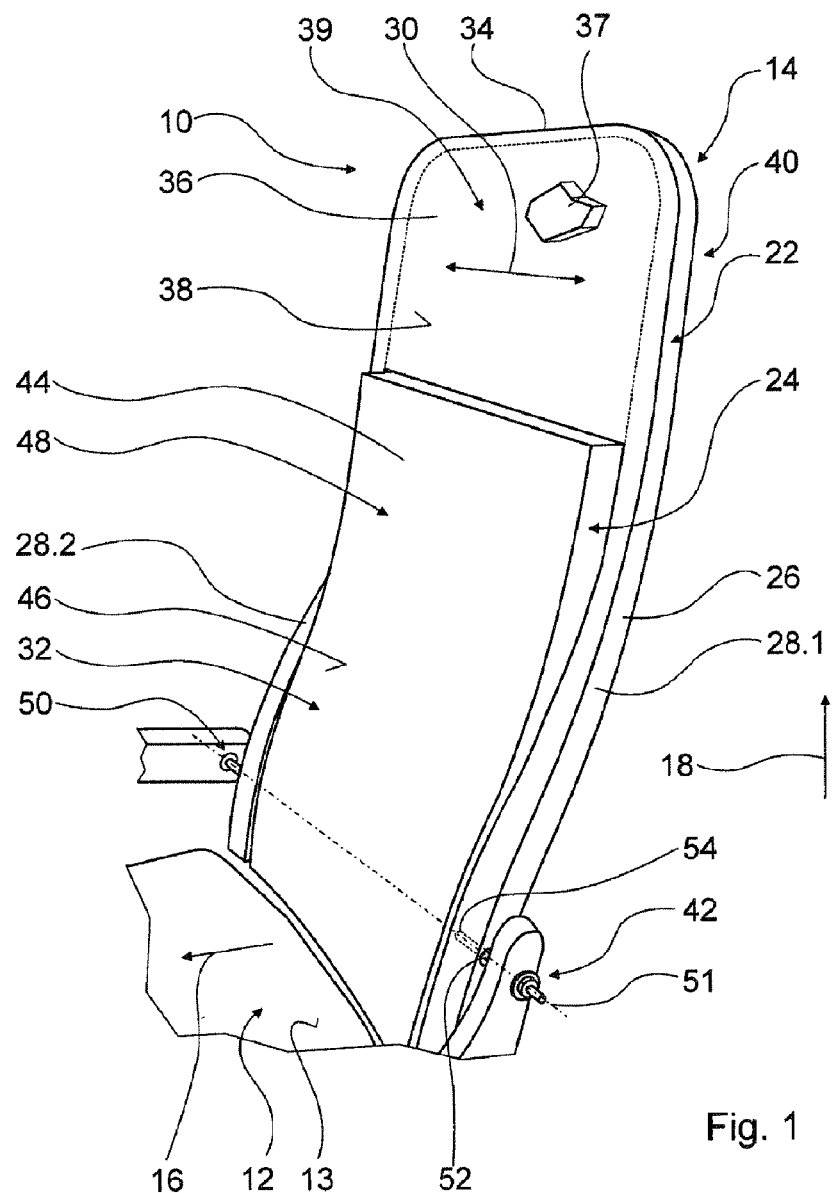
FIG. 1 is a perspective view of a flight passenger seat comprising a first, fixed backrest unit and a second, movable backrest unit.

FIG. 1 shows a flight passenger seat 10 in a perspective view. Said flight passenger seat has a seat unit 12 which forms a seat surface 13 and a backrest 14 which extends behind and above the seat unit 12 relative to a seat direction 16 and a vertical direction 18. The flight passenger seat 10 further comprises a mounting unit 19 (see FIG. 2) which is provided for mounting the seat unit 12 and the backrest 14 on an aircraft cabin floor 20. "Seat direction 16" is intended to be understood as a direction which is oriented parallel to the aircraft cabin floor 20 and perpendicular to the front edge of the seat unit 12 and leads away from the backrest 14. The seat direction 16 typically corresponds to the flying direction. "Vertical direction 18" is intended to be understood as a direction which is oriented perpendicular to the aircraft cabin floor 20. In this description the terms "in front of" "behind" "front", "front face", "front side" "rear side" etc. refer to the seat direction 16. Moreover, the terms "top" "bottom" "above" "below" etc. refer to the vertical direction 18.

The backrest 14 has a first backrest unit 22 and a second backrest unit 24. The backrest unit 22 has a backrest frame 26 which is shaped as a curved U-shaped component. Said component has two frame parts 28.1, 28.2 which in each case correspond to an arm of the U-shape and extend in the longitudinal direction of the backrest 14. The frame parts 28.1, 28.2 are configured as elongate components which are arranged on opposing sides of the backrest 14 relative to a transverse seat direction 30. "Transverse seat direction 30" is intended to be understood as a direction which is oriented parallel to the aircraft cabin floor 20 and perpendicular to the seat direction 16. The frame parts 28.1 and 28.2 are spaced apart from one another in the transverse seat direction 30 and form an intermediate space 32 in which the second backrest unit 24 is arranged. The frame parts 28.1 and 28.2 are connected together by means of a further frame part 34, which extends horizontally in the transverse seat direction 30 and, in cooperation with the frame parts 28, forms the U-shape. On the front face of the backrest frame 26 a cover 36 is attached which forms a bearing surface 38 for supporting a backrest cushion unit 37 in a headrest region 39 which is provided for supporting the passenger head. The backrest cushion unit 37 is only partially shown, for the sake of clarity. The cover 36 may be fastened, for example, to the backrest frame 26 by means of screws (not shown). The bearing surface 38 is in this exemplary embodiment formed by the cover 36; alternatively it is conceivable that the bearing surface 38 is formed by a partial region of the backrest frame 26. The bearing surface 38 in the headrest region 39 extends in the transverse seat direction 30 from one side of the backrest 14 to the opposite side of the backrest 14.

In the exemplary embodiments under consideration, the first backrest unit 22 is rigidly connected to the mounting unit 19 (see FIG. 2) so that a tilting movement of the first backrest unit 22 relative to the seat unit 12 and to the mounting unit 19 is not permitted. As a result, advantageously space may be gained for a passenger seated behind the flight passenger seat 10. By means of the present invention, in this configuration which is advantageous relative to the space taken up, a high degree of comfort may nevertheless be obtained for a passenger seated in the flight passenger seat 10.

According to the invention, a flight passenger seating device 40 is provided which has the backrest 14 comprising the backrest units 22, 24 and a bearing unit 42 which movably mounts the second backrest unit 24 relative to the first backrest unit 22. The second backrest unit 24 has a backrest plate 44. In the exemplary embodiment under consideration, the backrest plate 44 is configured as a deep-drawn part made of polycarbonate, wherein further embodiments which appear expedient to the person skilled in the art are conceivable. The backrest plate 44 is arranged in the intermediate space 32 which is defined to the side by the frame parts 28.1, 28.2 relative to the transverse seat direction 30 and is defined at the top relative to the longitudinal direction of the backrest 14 by the bearing surface 38 in the headrest region 39. The front side of the backrest plate 44 forms a bearing surface which serves for supporting the backrest cushion unit 37 in a region 48 which corresponds to the torso, which is provided for supporting the torso of the passenger. The bearing surfaces 38 and 46 form, by cooperation, a surface which corresponds at least to a large part of the entire backrest surface of the backrest cushion unit 37 which may be used by a passenger. In particular, the bearing surfaces 38 and 46 correspond at least to 80% of the entire backrest surface of the backrest cushion unit 37. The bearing surface 46 formed by the backrest plate 44 which is associated with the region 48 of the backrest cushion unit 37 which corresponds to the torso, extends from the lower edge region of the backrest 14 in the region of the seat unit 12 up to a height relative to the seat unit 12, which corresponds to the shoulder region of a passenger of average size. To this end, the size of the backrest plate 44 in the longitudinal direction of the backrest 14 is between 50% and 80%, preferably between 60% and 70%, of the overall length of the backrest 14. In this case, the first backrest unit 22 and the second backrest unit 24, by cooperation, form a complete bearing surface for supporting the backrest cushion unit 37, wherein the second backrest unit 24 forms with the bearing surface 46 thereof a substantial part, i.e. more than 50% of the overall bearing surface. The bearing surface 38 which is associated with the headrest region 39 of the backrest cushion unit 37, extends from the upper edge of the backrest plate 44 as far as the upper edge of the backrest 14 and accordingly has a dimension in the longitudinal direction of the backrest 14 which is preferably between 20% and 50%, advantageously between 30% and 40%, of the overall length of the backrest 14.

The bearing unit 42 mounts the second backrest unit 24 such that on the first backrest unit 22 it permits pivoting movements of the backrest unit 24 relative to the backrest unit 22. To this end, the bearing unit 42 has a pivot axis unit 50 which forms a pivot axis 51 which extends in the transverse seat direction 30 parallel to the aircraft cabin floor 20 and about which the second backrest unit 24 may be pivoted. The bearing unit 42 has fastening means 52 which fix the pivot axis unit 50 to the lateral frame parts 28.1, 28.2. The pivot axis unit 50 acts on the backrest plate 44, and namely on both sides on the lateral surfaces of the backrest plate 44 at coupling points 54 which—relative to the longitudinal direction of the backrest 14—are arranged in the lower half, preferably in the lowest third of the backrest plate 44. Thus, the pivot axis 51 is arranged relative to the longitudinal direction of the backrest 14 in the lowest quarter of the backrest 14.

FIGS. 2a and 2b show the flight passenger seat 10 in a highly schematic side view. For the sake of clarity, only the backrest 14 comprising the first backrest unit 22, which has the frame parts 28 of the backrest frame 26, and comprising the second backrest unit 24 which has the backrest plate 44, and the mounting unit 19 are shown. For the sake of clarity and for differentiating from the frame 28, the backrest plate 44 is schematically shown by a dotted line.

In FIG. 2a, the backrest plate 44 is located in a first end position 56 in which the upper edge of the backrest plate 44 is pivoted forward. This end position 56 corresponds to a first, upright seating position of the passenger which is denoted, for example, as the upright position. FIG. 2b shows the backrest plate 44 in a second end position 58 in which the upper edge of the backrest plate 44 is pivoted to the rear beyond the first backrest unit 22. This end position 58 corresponds to a second seating position of the passenger inclined to the rear which is denoted, for example, as the comfort position or "recline position". The bearing unit 42 permits pivoting movements of the backrest plate 44 between these end positions 56, 58.

The backrest 14 further comprises a coupling unit 60 which couples the second backrest unit 24 to a component which is rigidly connected to the first backrest unit 22. The coupling unit 60 is, on the one hand, coupled at a first coupling point 62 to the backrest plate 44 and, on the other hand, at a coupling point 64 of this component, wherein said coupling point 64 is rigidly connected to the first backrest unit 22. In the schematic view shown, the coupling point 64 is a point of the backrest frame 26 of the first backrest unit 22. If the backrest 14 is movably mounted relative to the mounting unit 19, the coupling point 64 is also movably mounted relative to the mounting unit 19. As the first backrest unit 22 in the exemplary embodiment under consideration, however, is rigidly connected to the mounting unit 19, the coupling point 64 of the coupling unit 60 is rigidly connected to the mounting unit 19. In alternative exemplary embodiments, the coupling point 64 may be a point of a further component rigidly connected to the mounting unit 19. Moreover, the coupling point 64 may be a point of the mounting unit 19, the seat unit 12, a seat floor bearing unit or an armrest unit.

In the exemplary embodiment shown, the coupling unit 60 has a coupling means 61 formed as a spring means. Said coupling means 61, which connects the coupling point 62 of the second backrest unit 24 to the coupling point 64, produces a spring force by means of which the coupling unit 60 secures the end positions 56, 58 as stable end positions. In the exemplary embodiment shown, the coupling means 61 is configured as a dead-center spring. In the end position 56 adopted by the backrest plate 44, the coupling means 61 is in a pretensioned state. The coupling means 61 attempts to hold the backrest plate 44 in the end position 56. For example, by means of pretensioning, the backrest plate may be forced against a stop, not shown in more detail. In order to move the movable backrest unit 24 into the second end position 58, the pretensioning force of the coupling means 61 has to be overcome. This takes place in a particularly simple manner, by the passenger exerting a force F on the part of the bearing surface 46 which is arranged above the pivot axis 51 by a movement of his/her back. If, when moving the backrest plate 44, the dead-center point of the coupling means 61 is overcome, the coupling means 61 relaxes in the direction of the second end position 58. In the configuration shown in FIG. 2b, the coupling means 61 attempts to hold the backrest plate 44 in the second end position 58. The coupling means 61 is slightly pretensioned, for example, in the second end position 58 and forces the backrest plate 44 against a stop, not shown, or the end position 58 is secured by the maximum spring path of the coupling means 61, wherein the coupling means 61 in this second end position 58 is in the relaxed state thereof. For moving the backrest plate 44 from the second end position 58, said backrest plate has to be moved by means of a force F' exerted by a movement of the back of the passenger onto the bearing surface 46 in the region below the pivot axis 51, against the spring force produced by the coupling means 61.

Figure 3:
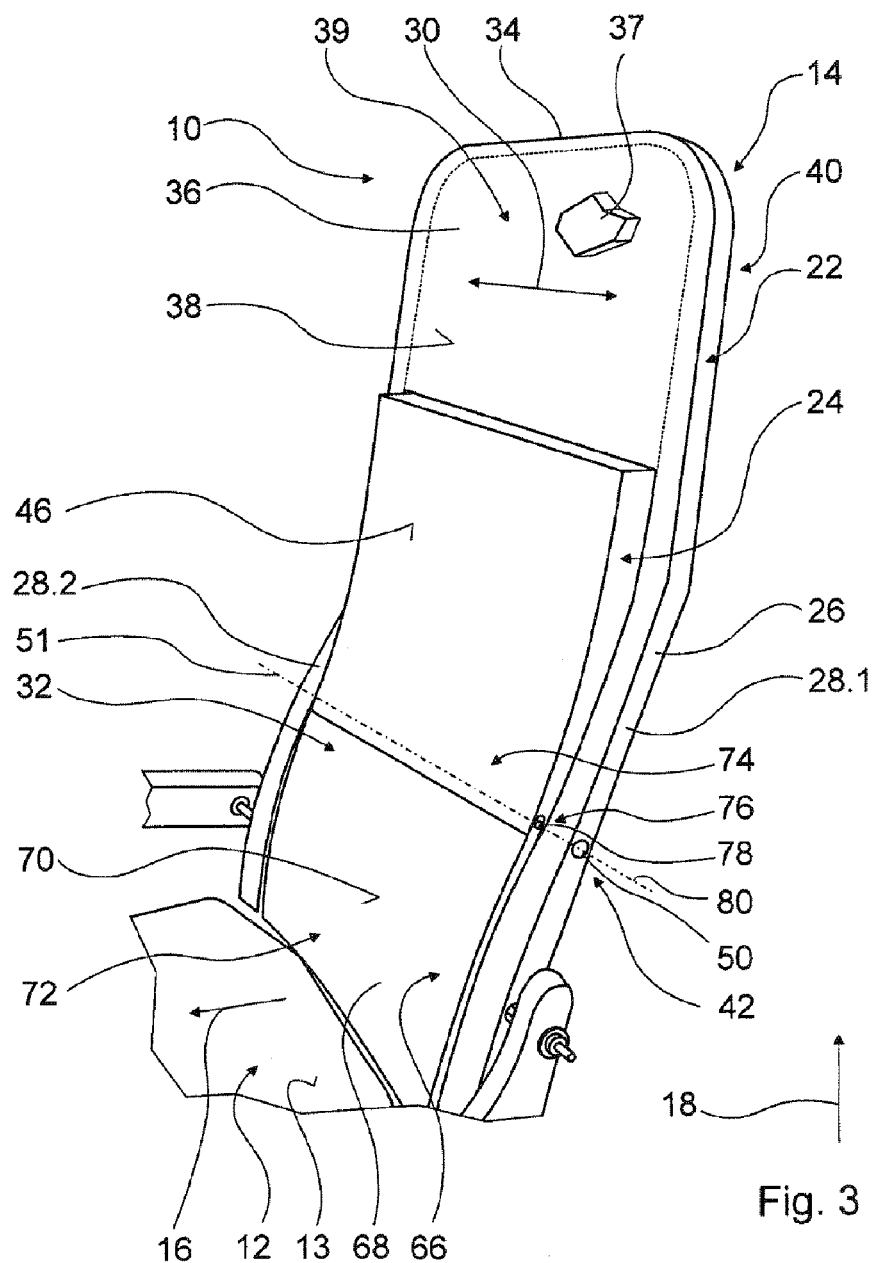
FIG. 3 is the view of FIG. 1 in an alternative embodiment of the flight passenger seat with a third backrest unit configured as a lumbar support.
Figure 4:
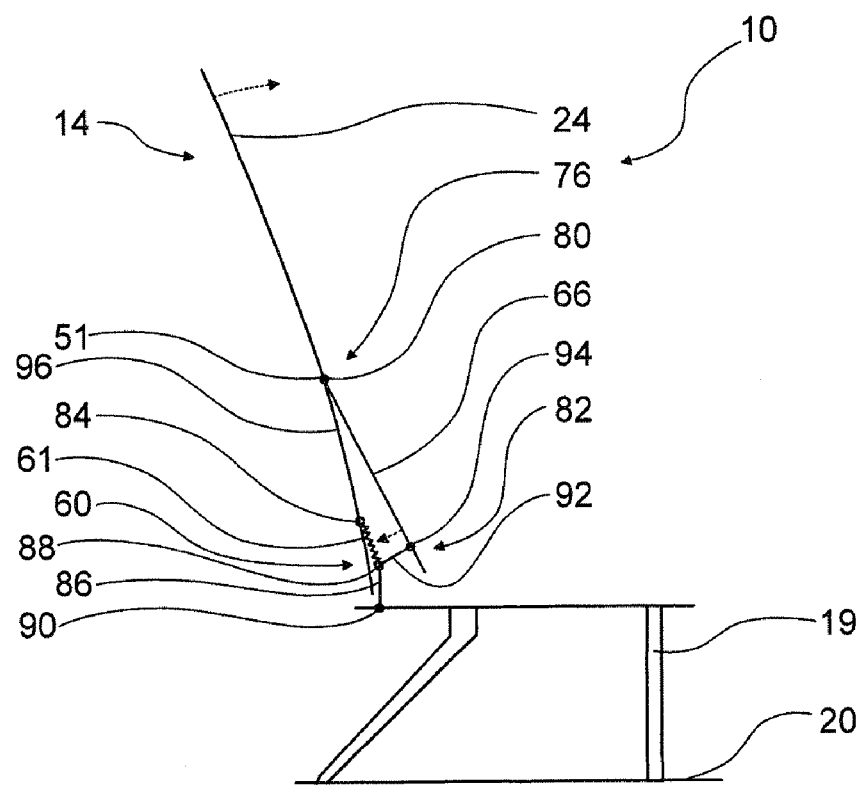
FIG. 4 is a schematic view of a coupling between the backrest units in the embodiment of FIG. 3.
Figure 5:
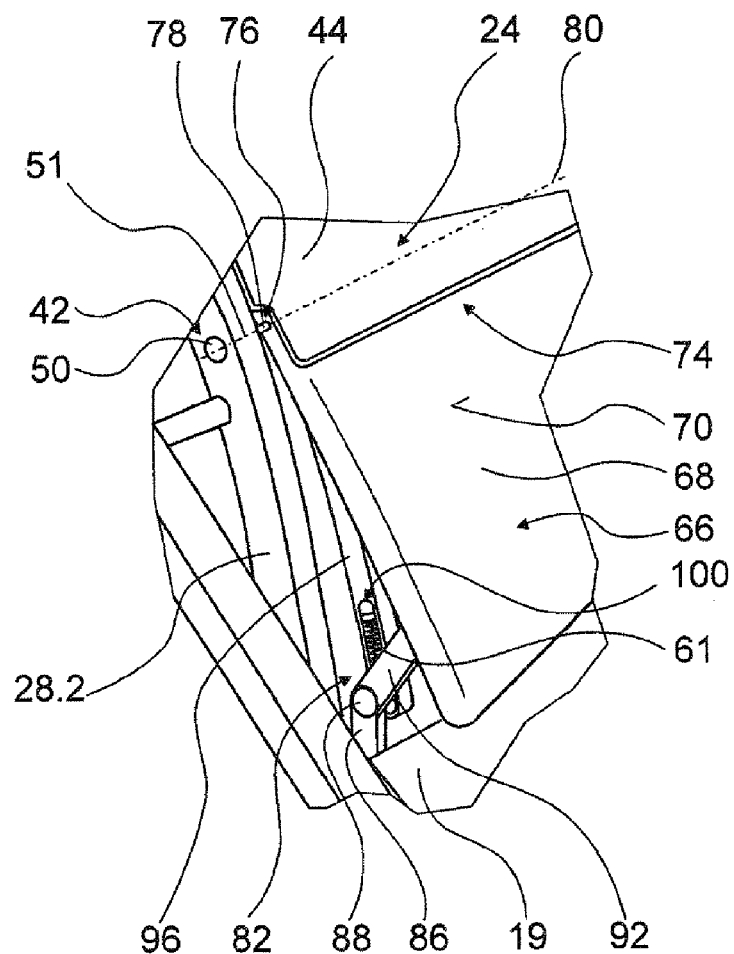
FIG. 5 is a perspective view of the coupling of FIG. 4.

FIGS. 3, 4 and 5 show the flight passenger seat 10 in a further embodiment of the flight passenger seating device 40 according to the invention. For the sake of clarity, components of which the construction and/or function correspond to the above-described exemplary embodiment are denoted by the same reference numeral and reference is made to the above description, in order to avoid unnecessary repetition. The following description is accordingly restricted to the differences from the above-described exemplary embodiment.

As may be derived from FIG. 3, in this embodiment the backrest 14 has a third backrest unit 66. Said third backrest unit is configured as a lumbar support 68 in the form of a plate. The third backrest unit 66 forms a bearing surface 70 for supporting the backrest cushion unit 37 in a lumbar region 72. This bearing surface 70 is accordingly arranged in the lower region of the backrest 14 and extends from the lower edge region of the backrest 14 to a coupling region 74 in which the lumbar support 68 is coupled to the backrest plate 44. The size of the bearing surface 70 in the longitudinal direction of the backrest 14 is between 30% and 50% of the overall size of the backrest 14 in the longitudinal direction thereof. Moreover, the backrest 14 has a bearing device 76 which movably mounts the lumbar support 68 of the third backrest unit 66 relative to the second backrest unit 24. To this end, the bearing device 76 has a pivot axis unit 78, which forms a pivot axis 80, about which the lumbar support 68 is pivotably mounted on the second backrest unit 24. In the exemplary embodiment shown, the pivot axis 51, about which the backrest plate 44 of the second backrest unit 24 is pivotably mounted relative to the first backrest unit 22, and the pivot axis 80 coincide.

The backrest 14 further comprises a coupler mechanism 82 which effects a movement of the third backrest unit relative to the second backrest unit 24, by a movement of the second backrest unit 24 relative to the first backrest unit 22. The coupler mechanism 82 is shown in the detailed view of FIG. 5, wherein the relative arrangement of the backrest units 24, 66 and the elements of the coupler mechanism 82 are shown for the sake of clarity in a highly schematic view in FIG. 4.

In FIG. 4, the aircraft cabin floor 20 and the mounting unit 19 are shown. For the sake of clarity, of the backrest 14 only the second and the third backrest unit 24, 66 and the coupler mechanism 82 are shown. As already described above, the second backrest unit 24 is pivotably mounted about the pivot axis 51 relative to the first backrest unit 22. For explaining the execution of this movement by a movement of the back of the passenger, reference is made to the above description. In the exemplary embodiment under consideration, the second backrest unit 24 is rigidly coupled via the coupling unit 60 to the mounting unit 19. To this end, the coupling unit 60 comprises the coupling means 61 configured as a spring element which at a first end is coupled to the second backrest unit 24 at a coupling point 84 fixed to the second backrest unit 24. The coupling unit 60 further comprises a coupling rod 86 which, on the one hand, is coupled at a coupling point 88 to the second end of the coupling means 61 and, on the other hand, to the mounting unit 19 at a coupling point 90 fixed to the mounting unit 19. The third backrest unit 66 is pivotably mounted, as already explained above, about the pivot axis 80 relative to the second backrest unit 24, the pivot axes 51 and 80 coinciding. For coupling the movement between the first and the second backrest units 22, 24 with the movement of the third backrest unit 66 relative to the second backrest unit 24, the coupler mechanism 82 is provided which comprises the coupling rod 86 and a coupling 92, which couples the coupling rod 86 to the third backrest unit 66. The coupling 92 is coupled, on the one hand, at a coupling point 94 of the third backrest unit 66 to said backrest unit 66, and acts, on the other hand, on the coupling point 88 of the coupling means 61.

The coupler mechanism 82 accordingly acts, on the one hand, on the coupling point 94 of the third backrest unit 66 and, on the other hand, on the coupling point 90 which is arranged on a component fixedly connected to the first backrest unit 22, and in the exemplary embodiment under consideration is namely arranged, in particular, on the mounting unit 19. In the further embodiments, the coupling point 90 may be attached to a seat floor bearing unit or directly to the first backrest unit 22, for example to the backrest frame 26. Moreover, the coupler mechanism 82 is connected via the deformable coupling means 61 to the second backrest unit 24, so that a relative movement of the second backrest part 24 relative to the first backrest unit 22 and accordingly relative to the mounting unit 19 activates a movement of the third backrest unit 66 relative to the second backrest unit 24. The coupling points 88, 90, 94 are configured as points of articulation. Moreover, the coupling points 84, 88, 94 are movable relative to the first backrest unit 22 and, in particular, to the mounting unit 19.

The flight passenger seat 10 is shown in FIG. 4 in a configuration in which the second backrest unit 24 is in the second end position 58 which corresponds to the above-mentioned comfort position or "recline position" (FIG. 2b). By a movement of the second backrest unit 24 from the second end position 58 into the first end position 56 (FIG. 2a), which corresponds to the above-mentioned upright position, by means of the coupler mechanism 82 the third backrest unit 66 is pivoted to the rear about the pivot axis 80 until it is folded back in the first end position 56 of the second backrest unit 24 onto an element 96 of the second backrest unit 24. The movements of the second backrest unit 24 and the third backrest unit 66 in the transition between the end position 58 (inclined position) and the end position 56 (upright position) are shown in FIG. 4 by means of dotted arrows. In the end position 56 which is shown in FIG. 3, the bearing surface 46 of the second backrest unit 24 and the bearing surface 70 of the third backrest unit 66 form a smooth bearing surface.

FIG. 5 shows the flight passenger seat 10 in the embodiment of FIG. 3 in a detailed view. The second backrest unit 24 and the third backrest unit 66 in the coupling region 74 are shown. The lumbar support 68 is pivotably mounted by means of the pivot axis unit 78 of the bearing device 76 about the pivot axis 80 relative to the backrest plate 44. The second backrest unit 24 has, in addition to the backrest plate 44, an elongate element 96 which is rigidly coupled to the backrest plate 44, and is arranged relative to the seat direction 16 behind the lumbar support 68. The backrest plate 44 and the element 96 as components of the second backrest unit 24 perform pivoting movements about the pivot axis 51, as explained with reference to the first exemplary embodiment. To this end, the pivot axis unit of the bearing unit 42 is fastened to the frame parts 28 of the first backrest unit 22.

On one side surface, the element 96 has a recess 100 in which the coupling means 61 formed as a spring element is mounted. As already described above with reference to FIG. 4, the coupling means 61 is coupled at the coupling point 88 to the coupling rod 86 which, in turn, is coupled to the mounting unit 19. The coupling of the coupler mechanism 82 acts on the coupling point 88 and is coupled at the coupling point 94 (FIG. 4) on the rear face of the lumbar support 68.

Figure 6:
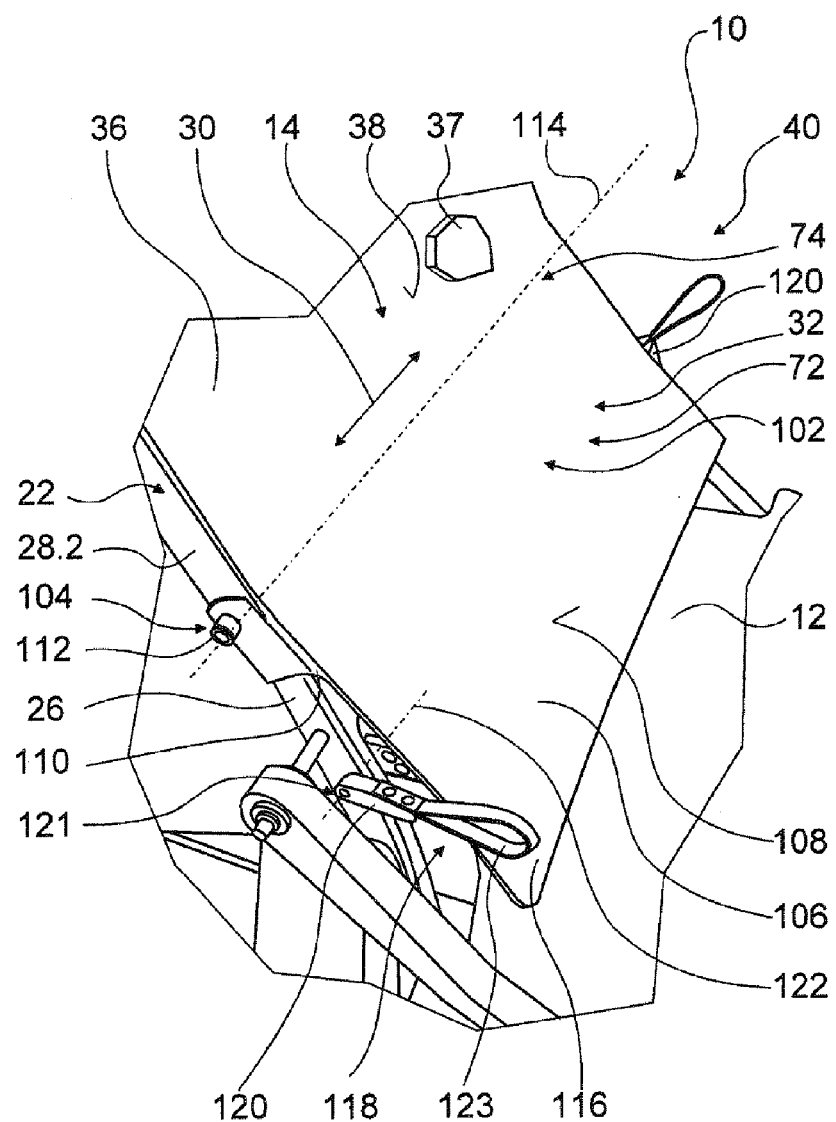
FIG. 6 is a perspective view of the flight passenger seat in an alternative embodiment with a movable lumbar support which may be actuated by a lever mechanism.

FIGS. 6, 7a and 7b show the flight passenger seat 10 in a further embodiment of the flight passenger seating device 40 according to the invention. For the sake of clarity, components of which the construction and/or function correspond to the first exemplary embodiment are denoted by the same reference numerals.

FIG. 6 shows a detailed view of the flight passenger seat 10. Said seat has, as in the previous exemplary embodiments, a seat unit 12 and a backrest 14. The backrest 14 comprises a first backrest unit 22 which has a backrest frame 26 which is shaped as a curved U-shaped component. Said component has two frame parts 28 which in each case correspond to an arm of the U-shape and extend in the longitudinal direction of the backrest 14. The frame parts 28 are configured as elongate components which, relative to the transverse seat direction 30, are arranged on opposing sides of the backrest 14. The frame parts 28 are spaced apart from one another in the transverse seat direction 30 and form an intermediate space 32. The frame parts 28 are connected together (see FIG. 1) by means of a further frame part 34, which extends horizontally in the transverse seat direction 30 and, by cooperation with the frame parts 28, forms the U-shape. On the front face of the backrest frame 26 a cover 36 is attached, and which is made of a material which forms a bearing surface 38 for supporting a backrest cushion unit 37. For the sake of clarity, the backrest cushion unit 37 is only partially shown. The bearing surface 38 extends in the transverse seat direction 30 from one side of the backrest 14 as far as the opposing side of the backrest 14.

The backrest 14 also has a second backrest unit 102 which is movably mounted by means of a bearing unit 104 relative to the first backrest unit 22. The second movable backrest unit 102 has a lumbar support 106 which forms a bearing surface 108 for supporting the backrest cushion unit 37 in the lumbar region 72 thereof. This bearing surface 108 is accordingly arranged in the lower region of the backrest 14 and extends from the lower edge region of the backrest 14 to a coupling region 74 in which the lumbar support 106 is coupled to the first backrest unit 22. The size of the bearing surface 108 in the longitudinal direction of the backrest 14 is between 30% and 50% of the overall size of the backrest 14 in the longitudinal direction thereof. The second backrest unit 102 has two support elements 110 and the bearing unit 104 comprises a pivot axis unit 112 which in each case pivotably mounts a support element 110 of the second backrest unit 102 on a frame part 28 of the first backrest unit 22. The pivot axis unit 112 forms a pivot axis 114 about which the support elements 110 of the second backrest unit 102 are pivotably mounted. On the support elements 110 a cover 116 is attached, and which forms together with the support elements 110 the lumbar support 106 and the bearing surface 108 thereof. In the exemplary embodiment under consideration, the cover 116 is integrally formed with the cover 36, so that the bearing surfaces 38 and 108 are components of a continuous, coherent bearing surface.

The bearing unit 104 movably mounts the lumbar support 106 between two stable end positions. The lumbar support 106 is shown in FIG. 6 in a folded-out position, in which the lumbar support 106 adopts its support function for supporting the lower spinal region of a seated passenger. In this configuration, the lower end of the support element 110 is remote from the frame part 28.2, the bearing surface 108 being inclined relative to the bearing surface 38 and a kinked region being produced at the boundary between both bearing surfaces 38, 108. Proceeding from this first end position, the lumbar support 106 may be folded to the rear about the pivot axis 114 relative to the first backrest unit 22, counter to the seat direction 16. In the second end position (FIG. 7b) the lower ends of the support elements 110 are moved closer to the frame parts 28 of the first backrest unit 22, a smooth transition being able to be achieved between the bearing surfaces 38, 108.

Said movement of the lumbar support 106 between the first and second end positions may optionally be activated by a passenger, and namely by means of an actuation unit 118. Said actuation unit has actuation members 120 which in each case are pivotably fastened to a frame part 28 of the first backrest unit 22 about a pivot axis 122 formed by a pivot axis unit 121. The actuation members 120 are provided to be actuated by a passenger. In each case a grip part 123 is coupled to the actuation members 120, and which is provided for simple operation by a passenger. In the exemplary embodiment under consideration, the grip parts 123 are configured as straps, wherein further embodiments which appear expedient to the person skilled in the art are conceivable. By the arrangement of the actuation members 120 in each case on a frame part 28, the existing constructional space is advantageously utilized, wherein no additional constructional space has to be taken up for the actuation unit 118. The actuation members 120 are arranged on both sides of the lumbar support 106. Moreover, the actuation members 120 are uncoupled from one another, so that they may be actuated independently of one another. An actuation of one of the actuation members 120 has no effect on the state of the other actuation member 120. The movement of the lumbar support 106 from one end position into the other end position takes place by simultaneous or chronologically separate actuations of the actuation members 120 by an operator. If only one actuation member 120 is actuated, an oblique position of the lumbar support 106 may be achieved which may be selected by a passenger as a further comfort position. In this oblique position, one of the support elements 110 of the second backrest unit 102 is folded back onto the first backrest unit 22, whilst the lower end of the second support element 110 is located in a position remote from the first backrest unit 22. This oblique position is shown in FIG. 6. In a further embodiment, however, it is conceivable that the actuation unit 118 has actuation members which are coupled together via a coupling device, so that an actuation of one of the actuation members by an operator automatically effects an actuation of the other actuation member. For example, the coupling device may be configured as a Bowden cable.

The actuation unit 118 is described further with reference to FIGS. 7a and 7b. Said figures show a detailed view of the actuation unit 118, wherein the viewing point is located in the intermediate space 32 behind the lumbar support 106. In particular, the frame part 28.2 of the first backrest part 22 may be seen, and on which the actuation member 120 (not visible in the figure) is arranged (see FIG. 6). Moreover, the support element 110 of the second backrest unit 102 shown in FIG. 6 may be seen and which forms together with the cover 116 the lumbar support 106, which may be seen from the rear.

The actuation member 120 is a component of a lever mechanism which also has two actuation members 124, 126 configured as lever members. The actuation member 124 acts on the pivot axis unit 121, so that it is pivotably mounted about the pivot axis 122. The actuation member 124 and the actuation member 120 are arranged on opposing sides of the frame part 28.2. By means of the pivot axis unit 121, moreover, the actuation member 120 and the actuation member 124 are rigidly coupled together, so that the pivot axis unit 121 effects a rotation of the actuation member 124 about the pivot axis 122, in the event of a rotation of the actuation member 120 about the pivot axis 122 activated by a passenger. The actuation member 126 is, on the one hand, connected to the actuation member 124 via an articulation 128 and, on the other hand, to the support element 110 of the lumbar support 106 via an articulation 130. The pivot axis unit 121, the actuation members 124, 126 and the articulations 128, 130 form a toggle lever.

The configuration shown in FIG. 7a corresponds to the comfort position of the lumbar support 106, shown in FIG. 6, in which the lower end of the support element 110 is in a position remote from the first backrest unit 22 and namely from the frame part 28.2. In this position, the actuation member 120 is located in a first, for example horizontal, end position (see FIG. 6). By rotating the actuation member 120 into a second, for example vertical, end position, the actuation member 124 is pivoted, wherein the support element 110 is moved into the position folded back onto the frame part 28.2 via the actuation member 126 and the articulations 128, 130 which are moved over a dead center point.

The invention claimed is:

1. A flight passenger seating device comprising:
   a backrest including a first backrest unit and a second backrest unit with a lumbar support;
   a bearing unit movably mounting the second backrest unit relative to the first backrest unit, the bearing unit having a pivot axis unit with a pivot axis, the second backrest unit pivoting about the pivot axis relative to the first backrest unit, and the lumbar support of the second backrest unit moving between at least two stable positions relative to the first backrest unit for a seated passenger; and
   a mechanical actuation unit having a lever mechanism actuating movement of the lumbar support from or to a stable position, the lever mechanism comprising at least one lever member pivot-mounted to the lumbar support, wherein
   the second backrest unit pivoting about the pivot axis relative to the first backrest unit is formed by a direct pivot connection of the first backrest unit and the second backrest unit via the bearing unit.

2. The flight passenger seating device as claimed in claim 1, wherein at least the second backrest unit forms a bearing surface for supporting a cushion unit.

3. The flight passenger seating device as claimed in claim 2, wherein the first backrest unit and the second backrest unit form, by cooperation, a bearing surface for supporting a cushion unit, wherein the second backrest unit forms at least a substantial part of the bearing surface.

4. The flight passenger seating device as claimed in claim 1, further comprising a mounting unit for mounting on an aircraft cabin floor, wherein the first backrest unit is rigidly connected to the mounting unit.

5. The flight passenger seating device as claimed in claim 1, wherein the first backrest unit has a backrest frame comprising at least two frame parts and the second backrest unit is arranged between the frame parts.

6. The flight passenger seating device as claimed in claim 1, wherein the first backrest unit has a backrest frame with at least one frame part and the actuation unit comprises an actuation member which may be actuated by the passenger and which is arranged on the frame part.

7. The flight passenger seating device as claimed in claim 6, wherein the actuation unit has actuation members which are arranged on opposing sides of the frame part.

8. The flight passenger seating device as claimed in claim 1, wherein the actuation unit is a passenger actuation unit arranged at a location suitable for actuation by a passenger.

9. The flight passenger seating device as claimed in claim 1, wherein the second backrest unit has two support elements, the pivot axis unit of the bearing unit pivotably mounts each of the two support elements of the second backrest unit on a frame part of the first backrest unit.

10. A flight passenger seating device comprising:
    a backrest including a first backrest unit and a second backrest unit with a lumbar support;
    a bearing unit that movably mounts the second backrest unit relative to the first backrest unit, the bearing unit having a pivot axis unit with a pivot axis, the second backrest unit pivoting about the pivot axis relative to the first backrest unit, the lumbar support of the second backrest unit is movable between at least two stable positions relative to the first backrest unit for a seated passenger; and a mechanical actuation unit having a lever mechanism that actuates movement of the lumbar support from or to a stable position, the lever mechanism comprising at least one lever member pivot-mounted to the lumbar support, the actuation unit having two actuation members that are arranged on both sides of the lumbar support and that may be actuated independently from one another.

* * * * *